(12) United States Patent  
Sadlek

(10) Patent No.: US 7,949,995 B2  
(45) Date of Patent: May 24, 2011

(54) VISUAL PROGRAMMING METHOD

(76) Inventor: James M. Sadlek, Canonsburg, PA (US)

( * ) Notice: Subject to any disclaimer, the term of this patent is extended or adjusted under 35 U.S.C. 154(b) by 1255 days.

(21) Appl. No.: 11/520,120

(22) Filed: Sep. 13, 2006

(65) Prior Publication Data

US 2007/0061778 A1  Mar. 15, 2007

Related U.S. Application Data

(60) Provisional application No. 60/716,816, filed on Sep. 14, 2005.

(51) Int. Cl.
*G06F 9/44* (2006.01)
*G06F 3/00* (2006.01)

(52) U.S. Cl. ........ 717/109; 717/114; 717/116; 717/104; 717/113; 715/762; 715/763; 700/17; 700/18; 700/83

(58) Field of Classification Search .................. 717/109
See application file for complete search history.

(56) References Cited

U.S. PATENT DOCUMENTS

| | | | |
|---|---|---|---|
| 5,301,336 A | 4/1994 | Kodosky et al. | |
| 5,313,575 A | 5/1994 | Beethe | |
| 5,325,533 A | 6/1994 | McInerney et al. | |
| 5,758,122 A * | 5/1998 | Corda et al. | 717/125 |
| 5,758,160 A * | 5/1998 | McInerney et al. | 717/104 |
| 5,862,379 A * | 1/1999 | Rubin et al. | 717/109 |
| 5,893,913 A * | 4/1999 | Brodsky et al. | 707/201 |
| 6,055,369 A * | 4/2000 | Sawahata et al. | 717/109 |
| 6,179,490 B1 * | 1/2001 | Pruitt | 717/109 |
| 6,735,764 B2 * | 5/2004 | Nakai | 717/156 |
| 6,775,647 B1 * | 8/2004 | Evans et al. | 703/7 |
| 7,000,191 B2 * | 2/2006 | Schmitt et al. | 715/764 |
| 2004/0148586 A1 * | 7/2004 | Gilboa | 717/108 |

OTHER PUBLICATIONS

Windows XP Tablet PC Edition 2005 Features; http://www.microsoft.com/windowsxp/tabletpc/evaluation/features.mspx; (5 pp.).
Windows XP Tablet PC Edition 2005: A Powerful Platform For Developers; http://www.microsoft.cpm/windowsxp/tabletpc/evaluation/overviews/platform.mspx; (1 p).
Developing Tablet PC Software by Using the Windows XP Tablet PC Edition 2005 Recognition Pack; http://msdn.microsoft.com/windowsvista/default.aspx?pull=library/en-us/dntablet/html/TabPC05RcPk.asp; (7 pp.).

* cited by examiner

*Primary Examiner* — Thomas K Pham

(74) *Attorney, Agent, or Firm* — The Webb Law Firm

(57) ABSTRACT

The invention is a computer programming method that includes inputting a drawing shape or drawing figure into a computer via a user interface of the computer. In response to a prompt that is generated related to the input drawing shape or drawing figure, data is input into the computer via the user interface. Computer program code is then synthesized that is related to the input drawing shape or drawing figure and the input data. The foregoing steps can be repeated for at least one other drawing shape or drawing figure that has an entry point connected to a previously entered drawing shape or drawing figure.

4 Claims, 17 Drawing Sheets

MATCH TO A-A ON SHEET 12 OF 17

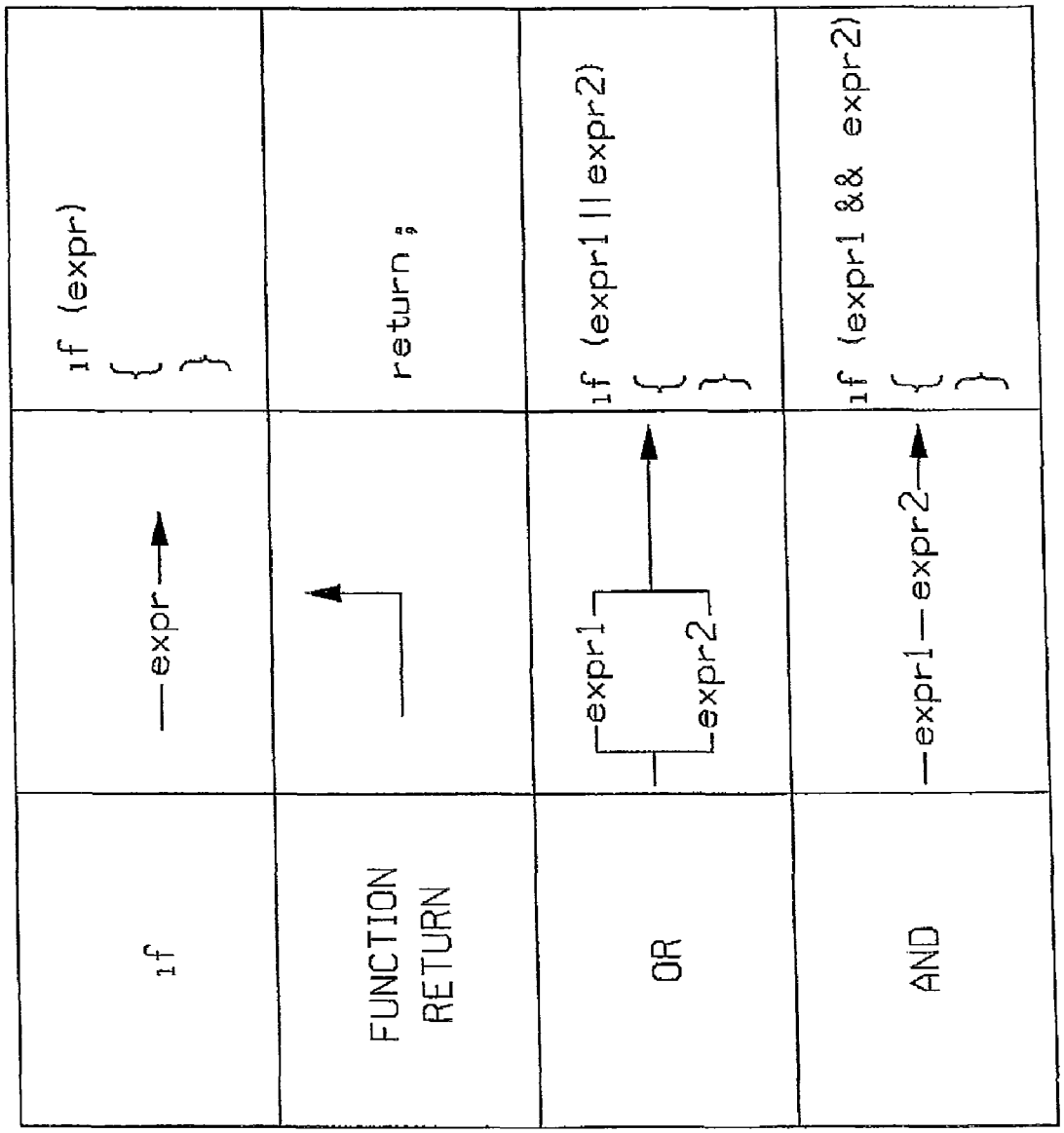

VISUAL PROGRAMMING METHOD

CROSS REFERENCE TO RELATED APPLICATION

This application claims priority from U.S. Provisional Patent Application No. 60/716,816, filed Sep. 14, 2005, the contents of which are incorporated herein by reference.

BACKGROUND OF THE INVENTION

1. Field Of The Invention

The present invention relates generally to the field of computer programming and more specifically to an interactive method for building and representing computer programs, and their control constructs, as visualizations or visual expressions in the form of shapes, such as lines, arrows, strokes, or directed paths, or a plurality of such visualizations that map to a plurality of multifarious, textual computer programming language control constructs.

2. Description Of Related Art

Software development is complex and buggy. As complexity continues to increase, our ability to comprehend the architecture and operation of large software systems as well as the ability to create large, complex software systems correspondingly decreases resulting in an ever-increasing gap, which has been referred to as the software crisis. The Wikipedia.org website defines the software crisis as a term used early in the days of software engineering, before it was a well-established subject, to describe the impact of the rapid increases in computer power and the complexity of the problems which could be tackled. It refers, in essence, to the difficulty of writing correct, understandable and verifiable computer programs.

Over the last century, the task of programming a computer has been marked with progressively discrete levels of abstraction away from underlying hardware. This progression will be described below up to the most recent modeling technologies that have been produced to grapple with voluminous amounts of code. State-of-the-art modeling paradigms show no signs of traction.

There is no silver bullet to date regarding the software crisis. Historically, the software industry has attempted to evolve programming with more and more incarnations of character-based languages to deal with the ever-increasing complexity and speed with which to program.

The use of computers and computer languages can be traced back to the nineteenth century. Charles Babbage's difference engine in 1822 was programmed to execute a task by changing gears, which made calculations.

Eventually, mechanical motion was replaced by electrical signals in a first generation digital computer in 1942. Execution then became a tedious task of resetting switches and rewiring the entire system—similar to the original telephone switchboards. The computer operator was a scientist that needed to intimately know the machine's instruction set. This instruction set consists of a seemingly endless stream of 1's and 0's, which are the machine language of digital computers.

After core memory was developed, programs could be easily loaded into memory and subsequently the CPU manually by flipping toggle switches. Address switches were set, then data switches, then a WRite switch. This process was repeated for all data and instructions, then the run switch was toggled.

Punch cards and paper tape were the proven input technology of the mid-nineteenth century and had been around since the early 1800's. Naturally, instructions ultimately were then stored on paper via hex keypads or terminals.

The first computer programming language for electronic computers was Short Code. It appeared in 1949 and operators manually changed shorthand statements such as JMP, BR or SUB, into 1's and 0's. In 1951 Grace Hopper wrote the first compiler, A-0, which translates a language's statements into 0's and 1's. Although easier to write and understand than machine language, operators still had to intimately understand how a computer functioned in order to create a working program.

The first high-level language, FORTRAN, appeared in 1957 and was used on second generation digital computers that used transistors instead of vacuum tubes. It's control constructs were limited to IF, DO and GOTO statements, which were a vast improvement over simple mnemonics such as JMP and BR used by assembly code. Data structures today can be traced back to FORTRAN 1. Other languages followed like COBOL for business applications, and Lisp for artificial intelligence. Programmers were insulated from the actual hardware by computer operators who were handed stacks of punch cards to feed into the machines.

Imperative languages (high-level languages centered around assignment statements) flourished during the third generation of digital computers, which shrank in size, due to the integrated circuit, but grew in capacity. Algol, BASIC, Pascal, Simula, Smailtalk, PL/1, and CPL are just a few, each with their own contribution. For example, CPL evolved into BCPL, that evolved into B, which subsequently paved the way for C. C is the first portable language that allowed a program written for one type of machine to be compiled and run on many other machines, again further removing the programmer from the underlying hardware. C has been one of the most popular programming languages for over 25 years.

C, with the help of Simula, spawned the object oriented computer language C++. The late 80's and early 90's saw object oriented languages dominate the scene. Smalltalk and C++ influenced the creation of Java, which influenced the creation of the now modern and state-of-the-art computer programming language C#.

FIG. 1 illustrates a block diagram depicting the different layers of abstraction programming languages have provided over the evolution of prior art in the field of programming, which insulate or distance the computer programmer from the underlying hardware. Block 1200 depicts the computer hardware that executes desired tasks since the first electronic computers were developed in the $20^{th}$ century. Block 1210 depicts the machine language of digital computers—ones and zeros. Block 1220 depicts low-level assembly languages which appeared in the mid $20^{th}$ century and are compiled down to machine language for the computer to understand. Block 1240 depicts high-level languages that flourished during the third generation of computers during the mid-to-late $20^{th}$ century and are also compiled or interpretted. Block 1230 depicts a middle-ware approach inserted between high-level and low-level languages that have become widely popular beginning in the late $20^{th}$ century to the present.

Looking at the history of programming languages, it is seen that most features are general and are available in many languages. It can be appreciated that many features of modern languages have been around for years. It can also be seen how the programmer's knowledge of the underlying hardware has been diminished over time.

There have been many attempts to address the way computers are programmed using visual programming languages over the past few decades. A visual language manipulates visual information or supports visual interaction, or allows programming with visual expressions. This is taken to be the definition of a visual programming language. Visual programming languages may be classified according to the type and extent of visual expression used: into icon-based languages, form-based languages, or diagram languages. Visual programming environments provide graphical or iconic elements which can be manipulated by the user in an interactive way according to some specific spatial grammar for program construction.

Current state-of-the-art visual programming is often referred to as iconic programming or executable graphics. Some visual languages are mere data flow models. A broader definition is systems that use graphics to aid in the programming, debugging and understanding of computer programs. This can include UML, Unified Modeling Language. A simple list of prior art follows.

One attempt to use flow diagrams is disclosed in U.S. Pat. No. 5,301,336, entitled "Graphical Method For Programming A Virtual Instrument", issued to Kodosky et al. on 5 Apr. 1994. Here, a GUI, or Graphical User Interface, utilizes data flow diagrams to represent a given procedure. Data flow diagrams are assembled in response to user input, again using icons, which correspond to executable functions, scheduling functions and data types and are interconnected by arcs on the screen.

One attempt using icons is disclosed in U.S. Pat. No. 5,313,575, entitled "Processing Method For An Iconic Programming System", issued to Beethe on 17 May 1994. This system is based on an iconic programming system which enables a programmer to create programs by connecting or linking various icons together to comprise a program.

Yet another attempt, this time with modeling, lies in U.S. Pat. No. 5,325,533, entitled "Engineering System For Modeling Computer Programs", issued to McInerney et al. on 28 Jun. 1994. This system provides a human oriented object programming system where modeling is used to assist in the development of computer programs.

Visual Basic and the entire Microsoft Visual™ family are not, despite their names, visual programming languages. They are textual languages which use a graphical GUI builder to make programming interfaces easier on the programmer.

SUMMARY OF THE INVENTION

By abstracting the character-based syntax away, the present invention provides one common, standard programming interface for all textual languages enterprise-wide analogous to the Esperanto spoken language. The invention also has a reduced learning curve from an intuitive, visual front-end; more correct syntax by reducing the chance errors produced by typing statements one character at a time; and a real Rapid Application Development (RAD) programming environment where single strokes replace numerous, repetitive statements.

Program control constructs are common to nearly every language. Yet, each has evolved into their own dialect. As Latin is the root of all Western spoken languages, FORTRAN is the root of all high-level computer languages. Strokes can be thought of as one common representation to represent a control construct in many different textual programming languages. For example, in the present invention, a function or procedure is represented as a straight line or an arrow from top to bottom. This is analogous to the main thread of execution. Multithreaded applications could of course have two or more parallel lines. A loop is a branch off of the previous flow that loops back to a point of previous execution. A pre-condition loop would start at the top and loop back up. A post-condition loop would start at the bottom and loop back down. A conditional statement is a branch off of the previous flow that supports traditional if-then-else clauses.

BRIEF DESCRIPTION OF THE DRAWINGS

FIGS. 13(a)-13(m) show exemplary drawing symbols (or control constructs) and their text-based equivalents.

DETAILED DESCRIPTION OF THE INVENTION

Figure 1:
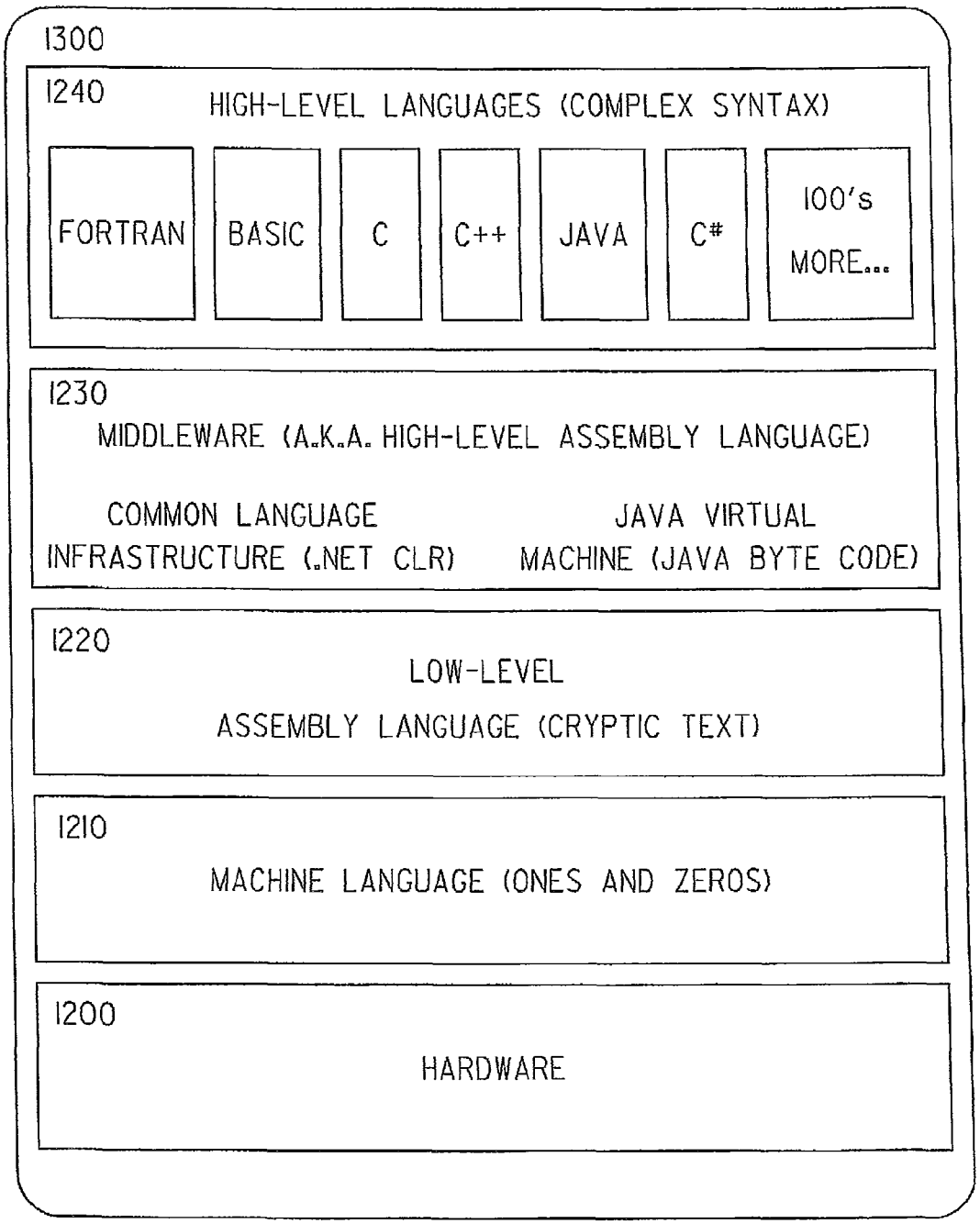
FIG. 1 is a block diagram showing a hierarchical relationship of different layers of abstraction in prior art programming.

The present invention will be described with reference to the accompanying figures where like reference numbers correspond to like elements.

The capture of program logic using the present invention utilizes state-of-the-art technologies that provide natural input methods. The invention utilizes, but is not limited to, the use of the pen recognition engine of the Microsoft Tablet PC operating system; the voice recognition engine of the Tablet PC operating system; as well as the shape recognition engine of the Tablet PC operating system. The Microsoft speech synthesis engine may be used to provide audible feedback and audible queues. The software development kits for these technologies are readily available from Microsoft Corporation.

The main development environment of the present invention is Microsoft Visual C# using the .Net Common Runtime Language. A Windows Forms application is used to handle the main event loop for the main software application. A so-called "ink control" from the Tablet PC software development kit (SDK) is used as the main control to accept "ink" drawn with a pen. The main application is menu driven.

The present invention utilizes custom shape recognition algorithms for handling limitations found in the built-in shape recognition engine of the Tablet PC operating system. Mainly, the Tablet PC shape recognition engine is limited to single-stroke gestures. The custom shape recognition algorithms of the present invention handle complex shapes with multiple strokes.

Pattern recognition based on a spatial parser applies an order of precedence for parent shape and child shape relationships. The order of precedence is left-to-right, top-to-bottom. A left-to-right sequence of shapes is a parent-child relationship with the parent being the leftmost shape. This defines a block of shapes. The leftmost, topmost shape is the topmost parent object in the internal ordered tree data structure. Within a block, a top-down sequence defines an ordered sibling relationship. Any left-to-right relationships defines another block, or sub-block, with a parent-child relationship.

A Tablet PC ApplicationGesture event, or similar custom or third-party event, is subscribed to handle the basic shape recognition of gestures. The Tablet PC SrokesAdded event, or similar custom or third-party event, is subscribed to handle the complex shape recognition for compound shapes. Using these events as triggers, the specific, recognized shapes or gesture combinations determine which program control constructs are to be created. This comprises shape recognition.

A class library of data structures is created internally that map to universal control constructs of text-based languages using an abstract syntax tree. These internal data structure objects mostly derive from a Shape object and are as follows: Parent, Namespace, Function, Program, If, Loop, For, Foreach, While, Print, Comment, Declaration, Expression, Assignment, Class, Field and Method.

In response to an event trigger, such as the entry of a drawing figure or shape, a new data structure object is instantiated. This object then knows how to prompt the user for string-literal identifiers that define the recognized control construct. For example, the drawing or construction of a down arrow would trigger the shape event handler. The handler would instantiate a new Program object. This object would then prompt the user for a program name. The hand-writing recognition engine would capture the digital ink and convert it into ASCII text, or the user could enter the ASCII text through a keyboard. This object is then the top-level object of the immediate visual programming script and the parent object in an ordered tree data structure. In the internal data structures, each specific shape inherits from the Shape object. Therefore, each shape has an array of multiple children nodes which are themselves members of the ordered tree data structure.

Figure 2:
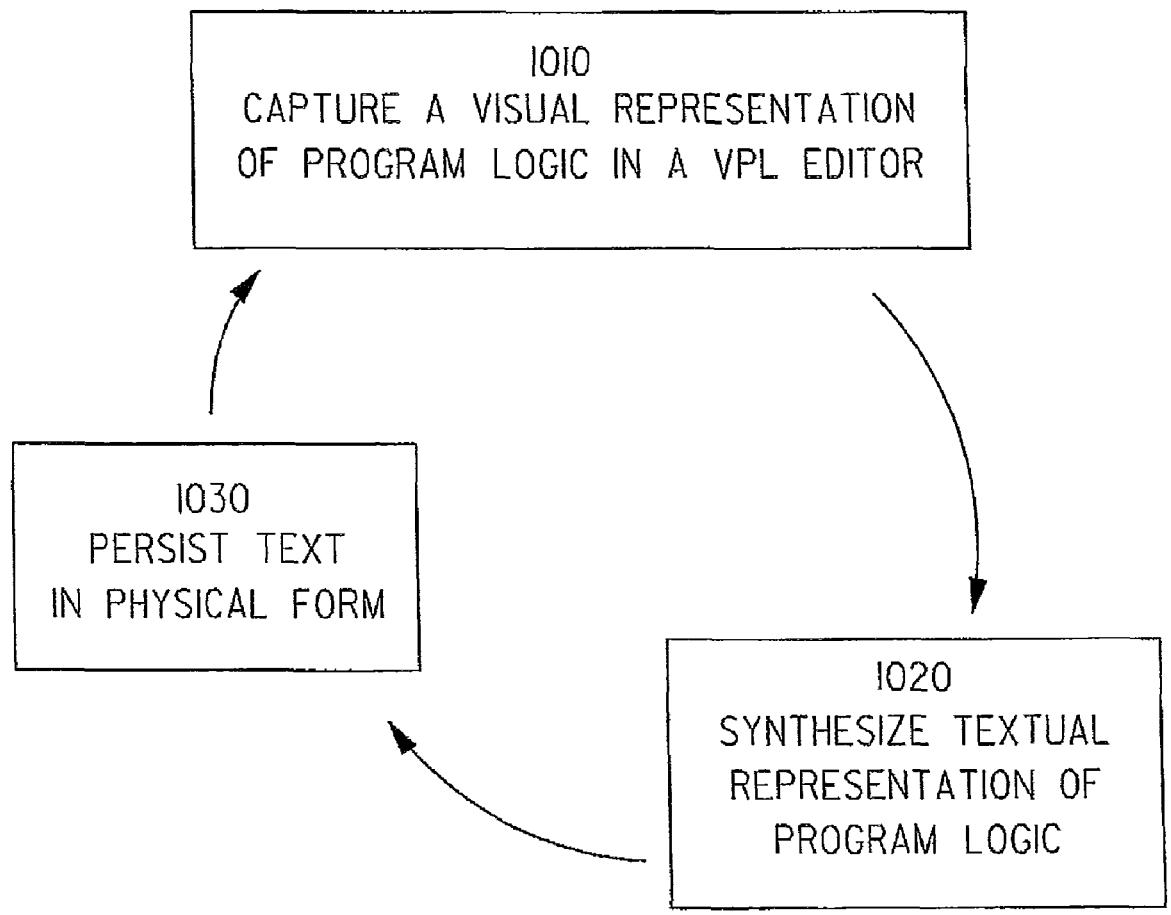
FIG. 2 is a simplified flow diagram illustrating a method of capturing visual logic and synthesizing textual code in accordance with the present invention.

With reference to FIG. 2, a block diagram illustrating an overview of a method of capturing program logic using the visual programming language of the present invention is shown. In FIG. 2, a visual representation of program logic is captured graphically as depicted in block 1010. In one embodiment, block 1010 depicts the use of a visual programming language editor application to capture pen strokes comprising a visual programming language on a Tablet PC. Block 1020 depicts a textual representation of computer program logic as synthesized from the visual representation. The textual representation may conform to any number of standard computer programming languages. Block 1030 depicts the program logic stored or persisted on disk in a physical form for use as source code to be compiled into machine language. Block 1030 can also be translated into the visual programming language as depicted in block 1010 as a visualization of existing high-level code for viewing, manipulation and edits.

Figure 3:
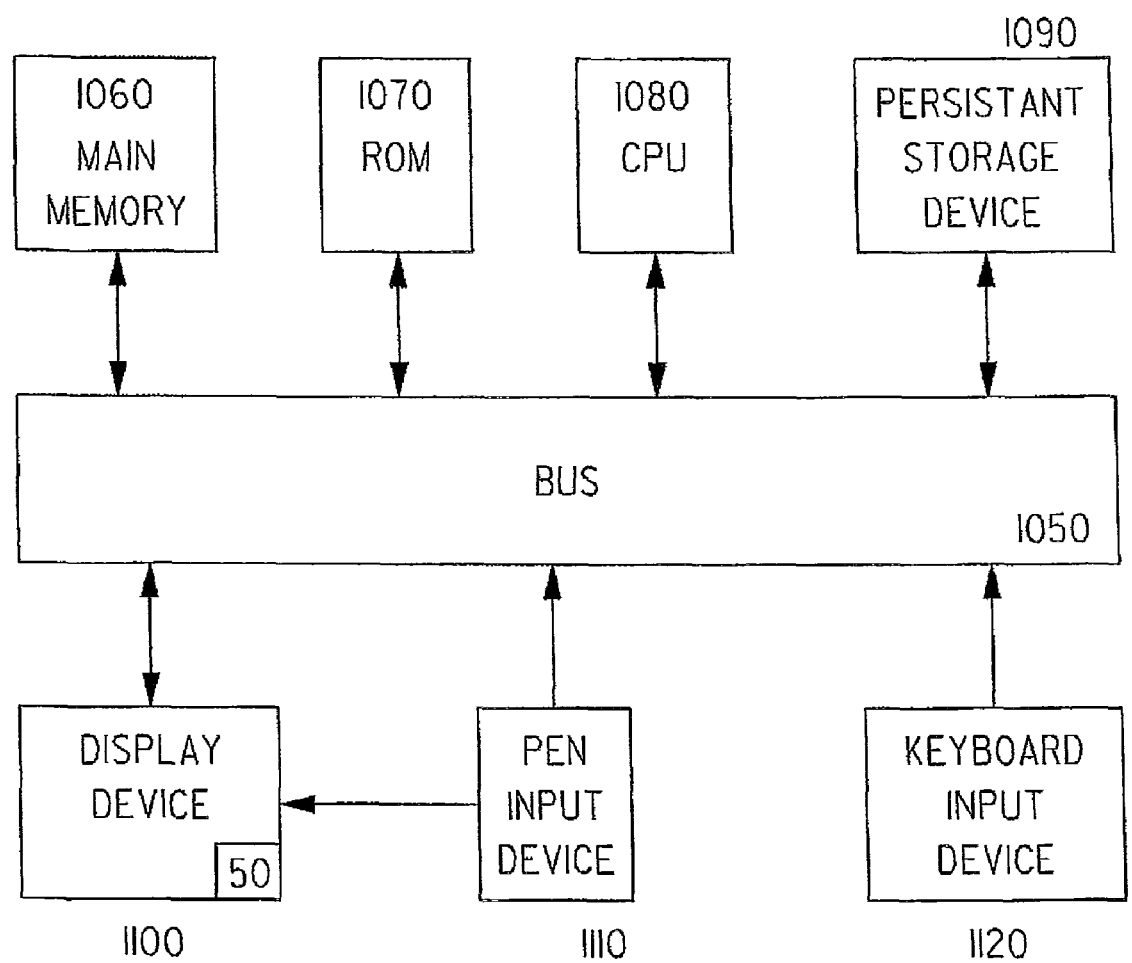
FIG. 3 is a block diagram of an exemplary computer system, such as a tablet PC, that may be utilized to implement the present invention.

With reference to FIG. 3, a block diagram illustrating an overview of a computer in which an embodiment of the invention may be implemented, such as a Tablet PC, is shown. This computer includes a communication bus block 1050 configured to convey information to other components of the system. Block 1060 depicts a main memory module used for storing computer instructions and program data structures for use in the system's central processing unit, CPU, as depicted in block 1080. Static information used to bootstrap the system may be stored in read-only memory, or ROM, as depicted in block 1070. Block 1090 depicts a persistent storage device, such as a magnetic or optical disk, for storing program instructions and information. Bus block 1050 may couple the system with a display device, such as a liquid crystal display device, or LCD, for display to the computer operator as depicted in block 1100. Block 1110 depicts an input device, such as a pen, for communicating information to the computer system. Block 1110 may be tightly coupled or integrated with display block 1100, which would comprise a device such as a Tablet PC. Block 1120 depicts a keyboard input device.

Figure 4:
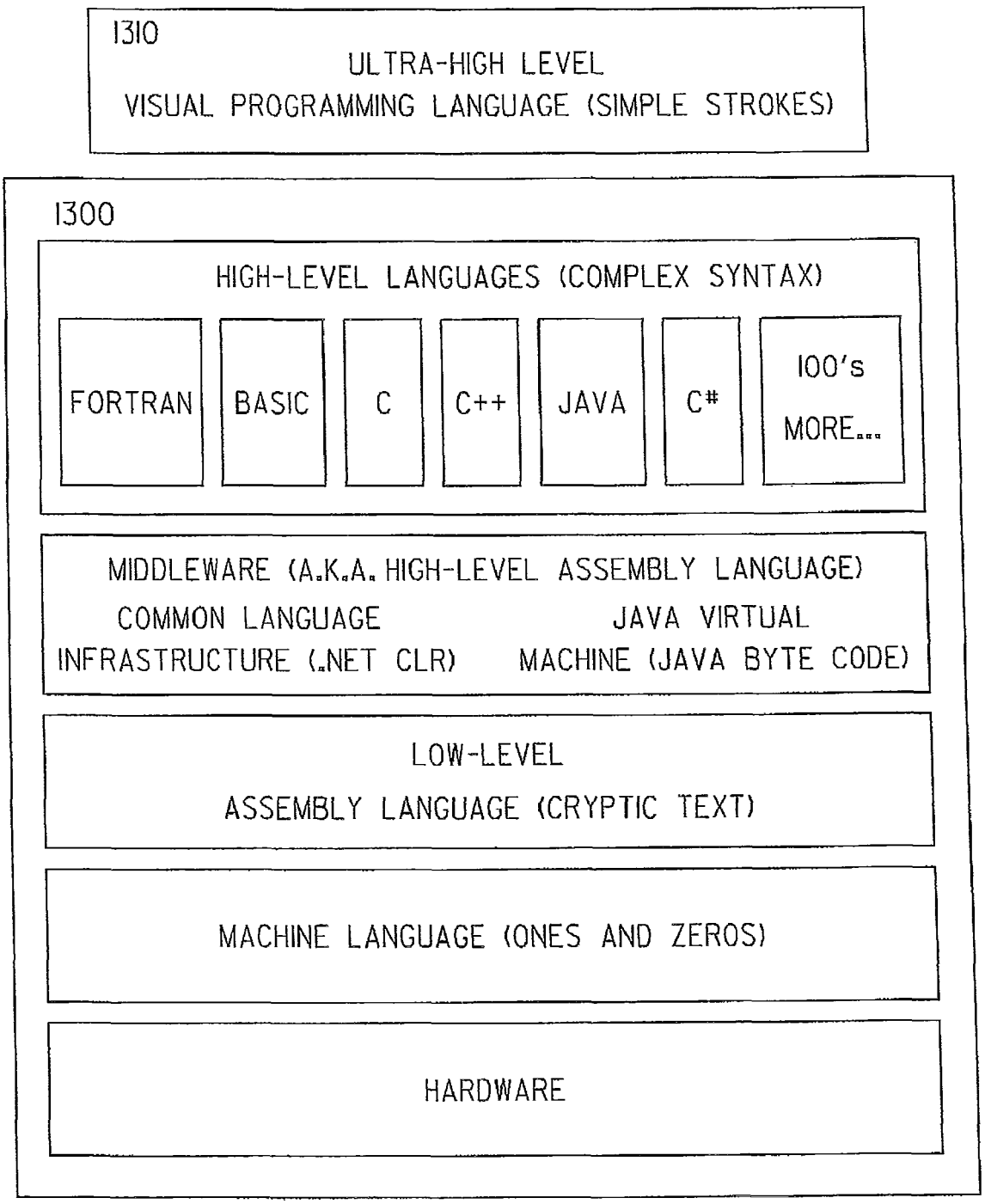
FIG. 4 is a block diagram showing a hierarchical relationship of the present invention to the prior art programming languages of FIG. 1.

With reference to FIG. 4, an abstraction of the present invention is manifested in an ultra-high-level visual programming language. Block 1310 depicts the invention above all other textual programming languages as depicted in block 1300, also shown in FIG. 1, in accordance to the progressive trend of abstraction away from the underlying hardware.

Figure 5:
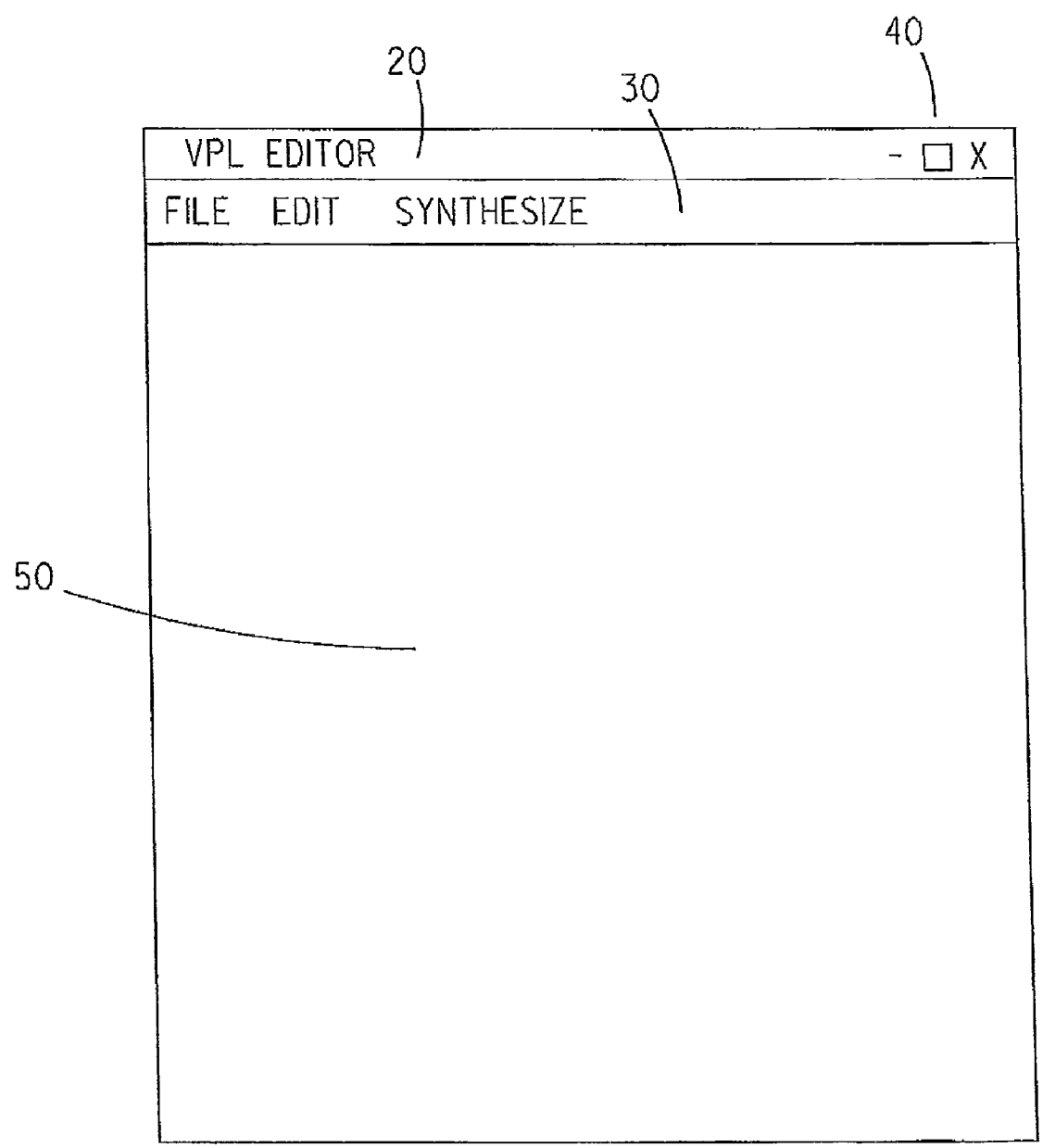
FIG. 5 is a diagrammatic illustration of a windowed screen display of an empty canvas displayable on the display device of the computer system of FIG. 3.

With reference to FIG. 5, an embodiment of the invention that a user would see as a graphical visual programming language (VPL) editor, or environment, on display device 1100 in FIG. 3, is shown. This editor can be referred to as VPL editor or just editor. The entire figure depicts a main window representing the main editing application in a windowing operating system, such as the Microsoft Windows Tablet PC Edition operating system. Element 20 depicts a title bar for the main window. Element 30 depicts a menu bar for the main window. The menu bar has a "File" and "Edit" menu like most windowed applications which includes common sub-menu commands representing frequently used functions or commands related to a file operation or an edit operation. Element 30 also includes a "Synthesize" menu command. Element 40 depicts a minimize, maximize and close control. Element 50 depicts a drawing and display canvas.

With further reference to element 30, the "Synthesize" command performs two tasks. The first task is to translate the visual control constructs of the visual programming language of the present application to a text-based representation in any one of a number of existing high-level or intermediate-level computer programming languages. The second is to properly pass through the non-control-construct statements as ASCII text in the same order of execution as captured during the visual and logical representation of the invented language. Execution of this command may be referred to as code synthesis.

The inner workings of code synthesis in accordance with the present invention are as follows. The internal data structures representing program logic are traversed during the code synthesis operation where each node of the syntax tree is visited. A virtual function overridden from the top-level object is called, Synthesize(), which subsequently iterates over all possible target languages checking for enabled targets. Each enabled target object has a corresponding function that contains the correct syntax associated with the named shape. For example, a top-level target is a Program. The Program shape's Synthesize() function is invoked. Each enabled target's Program function is subsequently invoked. The target's Program function opens a file and outputs the correct syntax for a main program in the target language's grammar. This process is repeated for each enabled target. The target's Program function then iterates over each child node in the Program's shape data structure, recursively calling Synthesize on each child shape. This process is repeated until every node is visited in the ordered tree data structure using a depth-first traversal.

Figure 6:
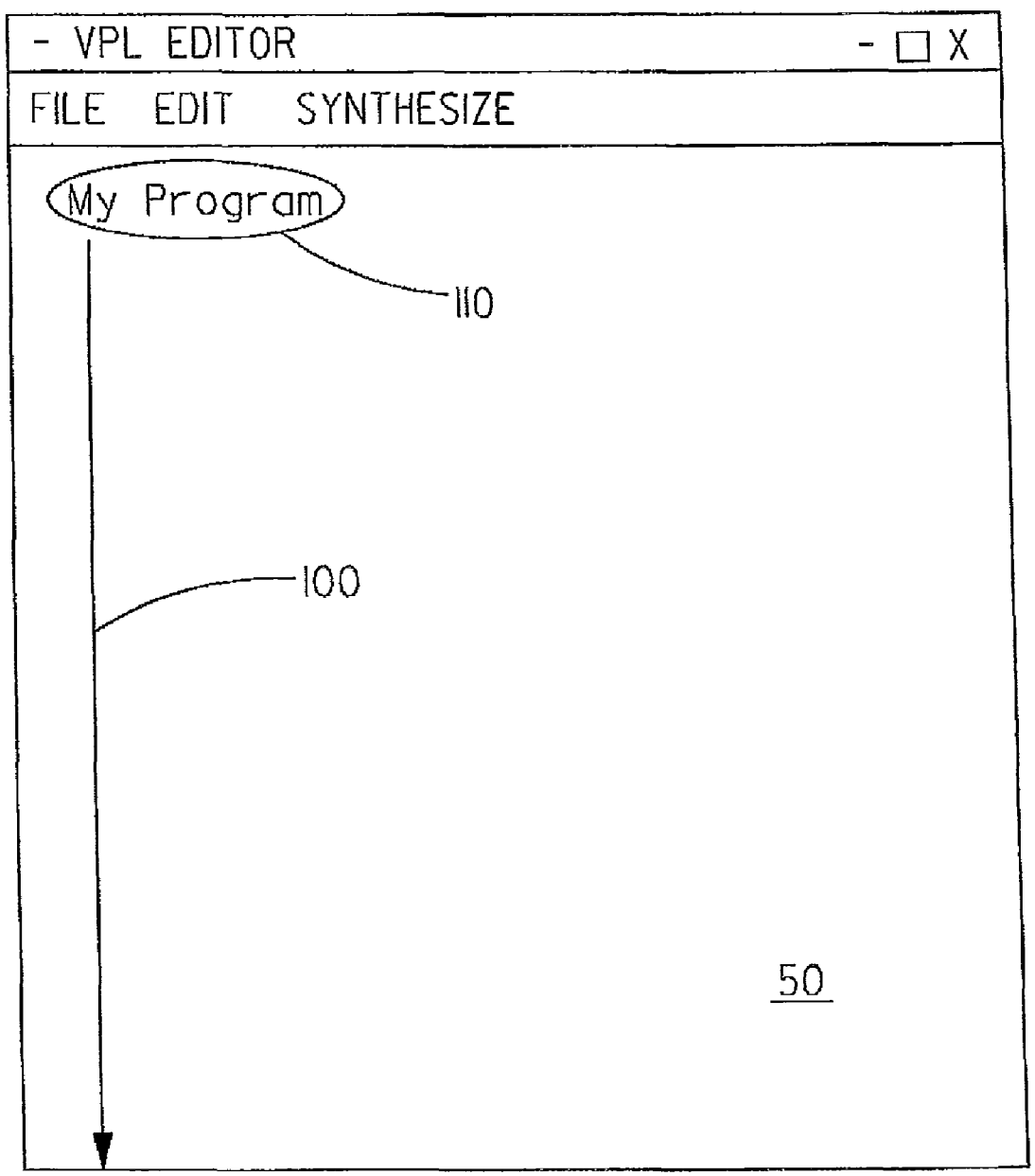
FIGS. 6-11b show the progressive use of drawing symbols and data entry in a manner to produce a computer program in accordance with the present invention.

With reference to FIG. 6 an instantiation of an exemplary program demonstrating the present invention includes element 100 depicting a "program" shape, or "function" shape depending on the context, that may be captured or drawn with a pen input device. Element 100 is a line or arrow drawn from the top of the page down toward the bottom. The computer recognizes the down-arrow shape and responds with a prompt for the function or program definition name 110. This is known as shape recognition in the Tablet PC operating system's application program interface, or API.

The user may enter the name using a pen into a pen-enabled input box or by other means of entering data, such as a keyboard or voice recognition. In the case of pen-enabled input, the computer recognizes hand-written text and converts the name to ASCII text. This is known as text recognition in the Tablet PC's API. The computer stores the shape representation and it's named text in variables adhering to the internal data structures that represent a structured syntax tree conforming to standard compiler theory.

In response to this shape recognition, the computer realizes that a function named "Main" does not exist and therefore implicitly designates this function as the main function named "Main". Every executable binary program must contain a main entry point. In code compiled from the C# programming language, that entry is called "Main". Therefore, the text captured in element 110 becomes the name of the text file, in this case, MyProgram.cs, that is created during the code synthesis operation including a ".cs" file extension. In compiler terminology, this file is known as a translation unit. This text-file based representation of program logic may be run through a compiler tool, such as the csc.exe Microsoft C# compiler, to produce a binary executable representation of the program logic.

This embodiment will synthesize the data structures representing the code needed to create a main function in the C# programming language as depicted in the following Listing 1:

Listing 1

```
namespace MyProgram
{
  class MyProgram
  {
    static void Main( )
    {
    }
  }
}
```

In the presence of a main program definition, alternatively, the invention would explicitly recognize the arrow shape as a named function and store the named shape in the appropriate variables adhering to the internal data structures representing a structured syntax tree conforming to standard compiler theory.

Declaring a program as in FIG. 6 defines a main thread of execution. Compiled versions of computer programs like the one depicted in Listing 1 are loaded from disk into memory and then executed from top to bottom, one instruction at a time. Therefore, the actual shape of the "Program" or "Function" shape is an arrow from top to bottom that visualizes this flow of computer instruction execution or control flow.

The present invention utilizes traditional input from a keyboard, as well as natural input mechanisms of the Tablet PC operating system to recognize hand-written text. Therefore, it is defined that any text recognition performed by the VPL editor application that is initiated without a computer prompt is interpreted as a literal block of non-control construct statements in the targeted text-based programming language upon code synthesis. The definition of blocks of non-control constructs is analogous to typing in a word processor or other computer program editors. The text is captured by the input device and displayed on the computer's display device at the place where the insertion cursor is located. This process is known as an echo to the screen, one character at a time.

Figure 7:
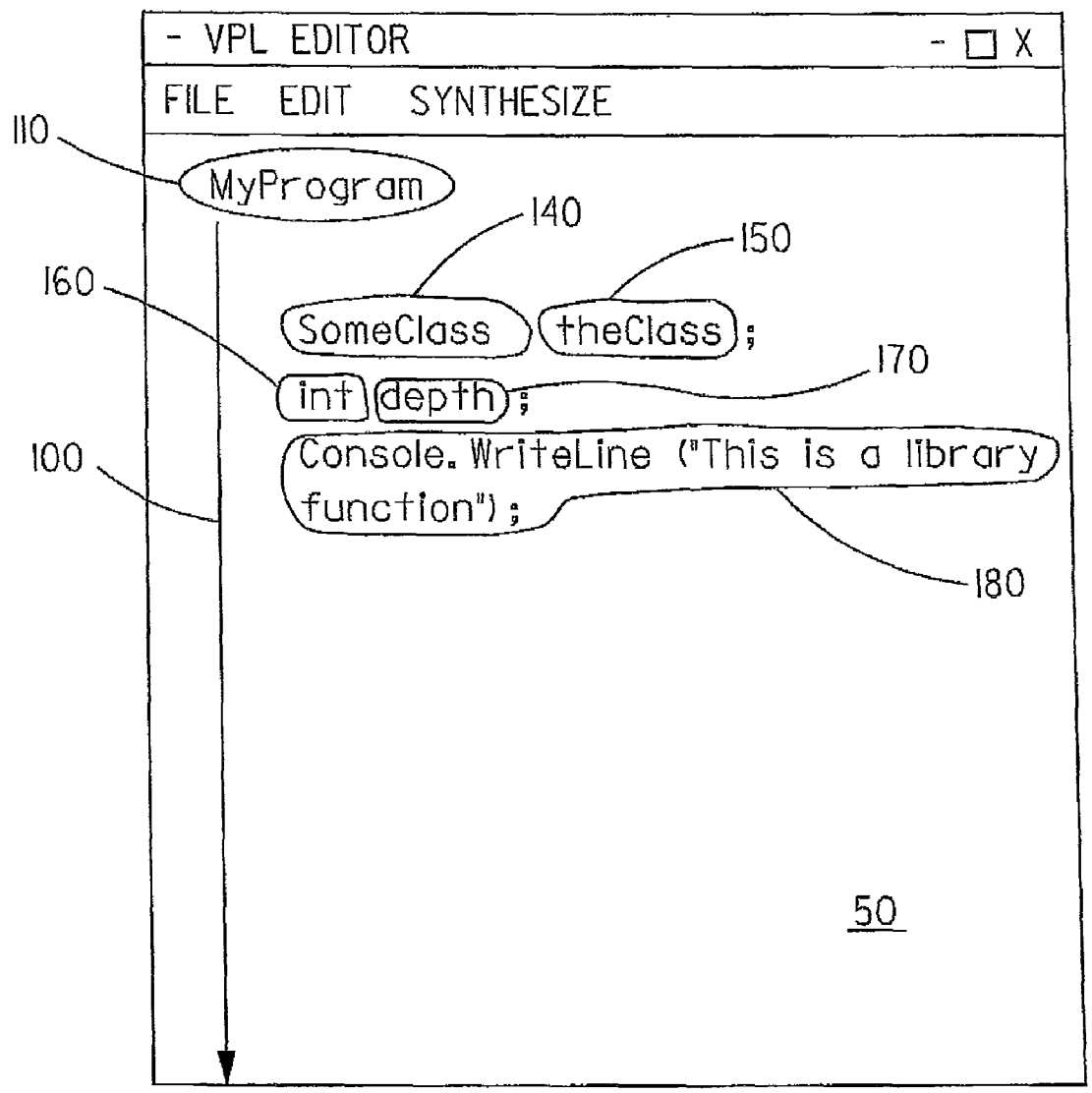

With reference to FIG. 7 and with continuing reference to FIG. 6, a block of non-control-construct statements is created just as in any traditional text-based programming language. Elements 140 and 150 comprise a local variable declaration within the scope of the defined thread of execution, in this case the main program. Element 140 is the type declaration and element 150 is the named variable associated with the type declaration. This variable declaration is captured with the following sequence of events. After creating a named program, the user begins typing on the keyboard. The computer responds by storing the text as a block of statements to be translated literally in the text-based code synthesis. The block is stored as a node in the internal data structures at the appropriate location to preserve the sequence of program execution as defined by the visual programming language. This type of node may be referred to as a literal grammar block or a block of non-control construct statements.

Elements 160 and 170 define another local variable declaration with element 160 being a type declaration, e.g., integer, and element 170 being the named variable associated with the type declaration. Element 180 is a reference to a library function instruction to the computer to produce output constructed in the form of the string of characters presented in quotation marks.

This embodiment would synthesize the corresponding C# code as depicted in the following Listing 2 for the illustration in FIG. 7:

Listing 2

```
namespace MyProgram
{
  class MyProgram
  {
    static void Main( )
    {
      SomeClass theClass;
      Int depth;
      Console.WriteLine("This is a library function");
    }
  }
}
```

Figure 8:
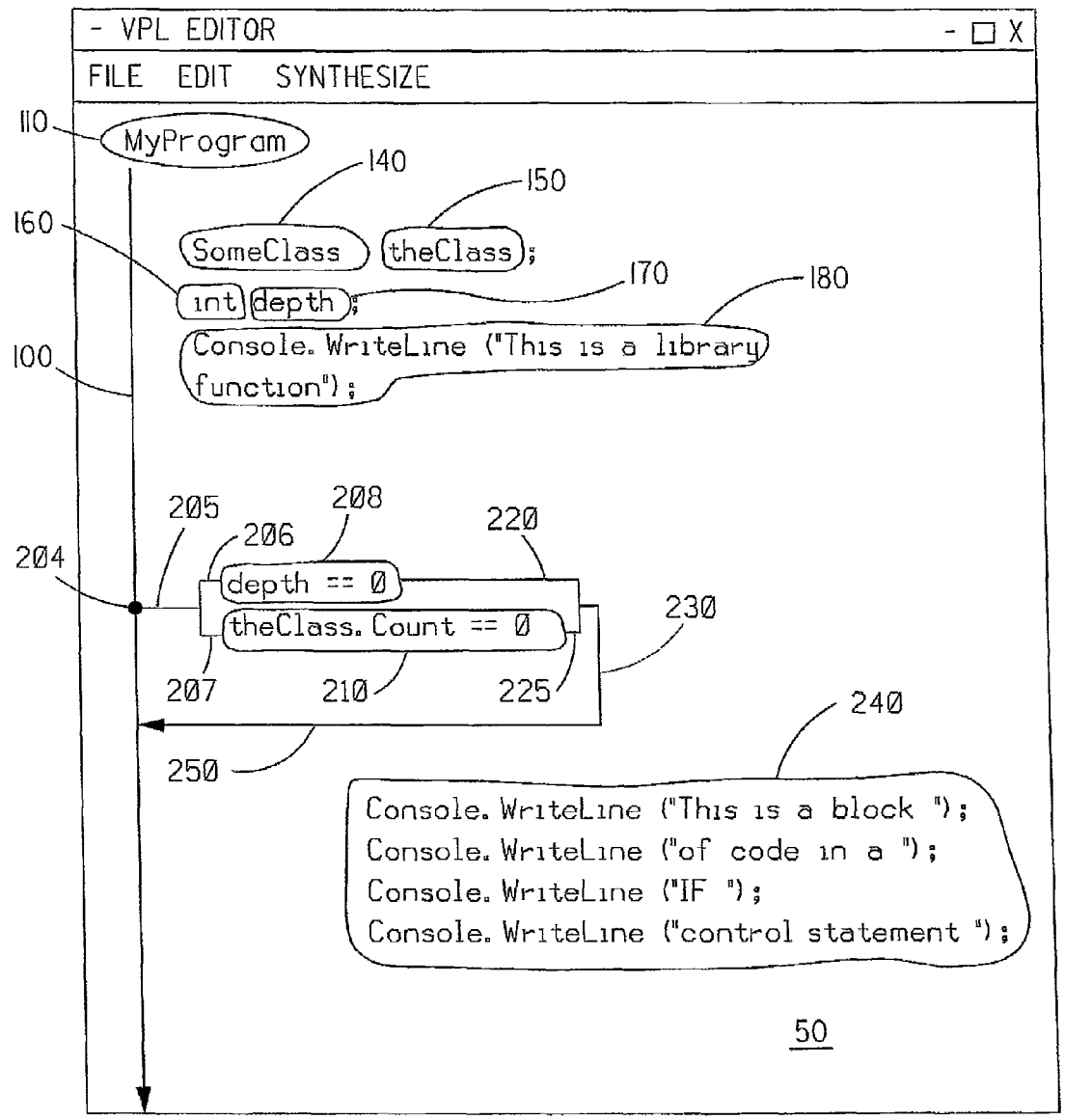

With reference to FIG. 8 and with continuing reference to FIGS. 6 and 7, an instantiation of a conditional control-flow statement branching off of the main thread of execution is shown wherein element 204 depicts the entry point of the conditional statement branching from the previous control flow. Element 206 depicts another branch to form a parallel branch of control flow that is analogous to a parallel electrical circuit. Element 208 depicts a Boolean control statement that resolves to either true or false. Elements 208 and 210 are analogous to switches in an electrical circuit that are either on or off, allowing or preventing the flow of electrons respectively. Element 210 is another Boolean control statement. Elements 208 and 210 taken together depict an 'or' condition in text-based computer programming languages. Either condition can be true for the resulting block of code to be executed. Element 220 depicts the joining point of control flow that returns program control flow into element 230. Element 230 depicts the local branch of control flow also known as the shapes body. Element 240 depicts a block of non-control construct statements that are executed if either conditions in elements 208 and 210 resolve to true. Element 250 is the return path of control-flow to the calling thread of execution.

In operation, the user constructs the visual shape by first drawing a line segment from a point 204 intersecting the main branch to the left and extending the line segment to the right as depicted by element 205. The computer recognizes the shape as a conditional expression and responds with a prompt for a condition expression. The user types the conditional expression "depth==0". The computer responds by completing the conditional expression shape depicted in elements 220, 230 and 250. This is analogous to completing an electrical circuit. The computer stores the shape representation and it's text in variables adhering to the internal data structures that represent a structured syntax tree conforming to standard compiler theory.

The user then draws with a pen and intersects element 205 with an "L" shape as depicted by element 207. The computer recognizes this shape in the context of the conditional statement and prompts the user for another condition in parallel with element 208. The computer responds with a prompt for another conditional statement. The user then types the conditional expression "theClass.Count==0". The computer then joins the control flow from the preceding conditional statement in element 210 to the local branch of control flow depicted in element 230. This join is depicted by element 225. The computer updates the shape representation in internal data structures.

Element 240 depicts a block of non-control construct statements that are created when the user types text without a prompt from the computer. This is analogous to typing into a normal text editor at the current cursor location.

This embodiment would synthesize the corresponding C# code as depicted in the following Listing 3 for the illustration in FIG. 8:

---
Listing 3
---

```
namespace MyProgram
{
   class MyProgram
   {
      static void Main( )
      {
         SomeClass theClass;
         int depth;
         Console.WriteLine("This is a library function");
            if(depth == 0 || theClass.Count == 0)
            {
               Console.WriteLine("This is a block ");
               Console.WriteLine("of code in an ");
               Console.WriteLine("IF ");
               Console.WriteLine("control statement");
            }
      }
   }
}
```

Figure 9:
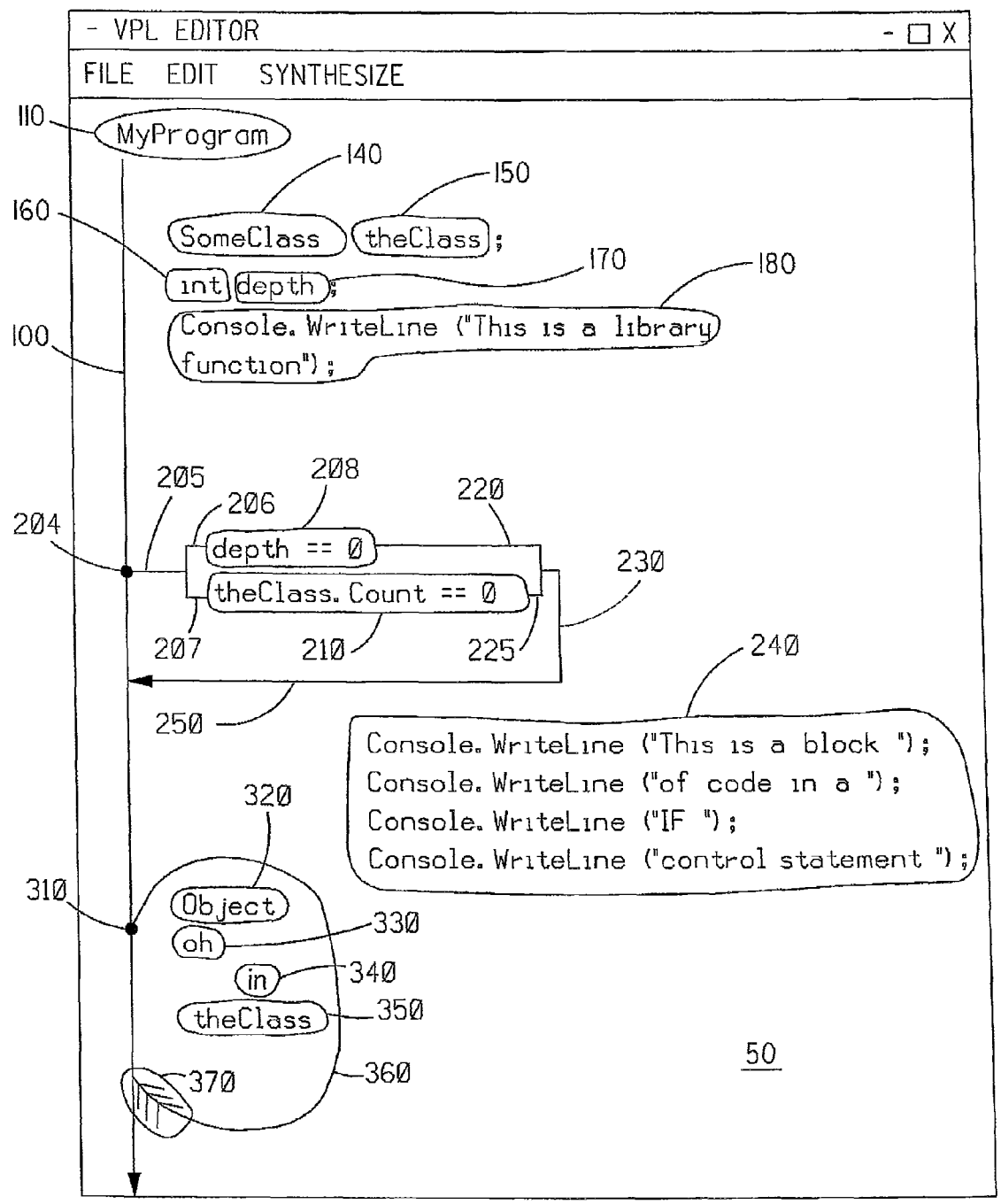

FIG. 9 is an instantiation of a looping control construct branching off of the main thread of execution in sequence immediately following the conditional construct above it. This particular looping control construct is analogous to a 'foreach' loop in C#. Element 310 depicts the entry point of the looping statement branching from the previous control flow. Element 320 depicts a local variable type declaration to the looping body. Element 330 depicts a variable declaration associated with the type in element 320 that receives a member from the collection depicted in element 350. Element 340 is the keyword 'in' that ties the local variable declaration from 320 and 330 to element 350. Element 360 depicts the local branch of control flow that is executed for each element that exists in 350. Element 360 is also known as the shapes body. Element 370 depicts a triple-headed arrow representing the point of return to the calling thread of execution. The shape of element 370 differentiates this loop from other forms of looping control constructs, such as 'for' and 'while' loops.

The user constructs the visual shape by drawing a curved arc intersecting the main branch at element 310 and initially extending the curve in the upward direction, then looping the curve downward and then back up to intersect the main branch again at element 370. The user then draws three arrow heads at the head of the arrow depicted in element 370. The computer recognizes this shape as a looping control construct and responds with a prompt for a local variable type and declaration for elements 320 and 330, respectively. The user types the declaration. The computer responds by displaying element 340 and prompting for the name of the collection in element 350. The user types the referenced collection name. The computer stores the shape representation and it's text in variables adhering to the internal data structures.

This embodiment would synthesize the corresponding C# code as depicted in the following Listing 4 for the illustration in FIG. 9:

---
Listing 4
---

```
namespace MyProgram
{
   class MyProgram
   {
      static void Main( )
      {
         SomeClass theClass;
         int depth;
         Console.WriteLine("This is a library function");
         if(depth == 0 || theClass.Count == 0)
         {
            Console.WriteLine("This is a block ");
            Console.WriteLine("of code in an ");
            Console.WriteLine("IF ");
            Console.WriteLine("control statement");
         }
         foreach(Object oh in theClass)
         {
         }
      }
   }
}
```

Figure 10:
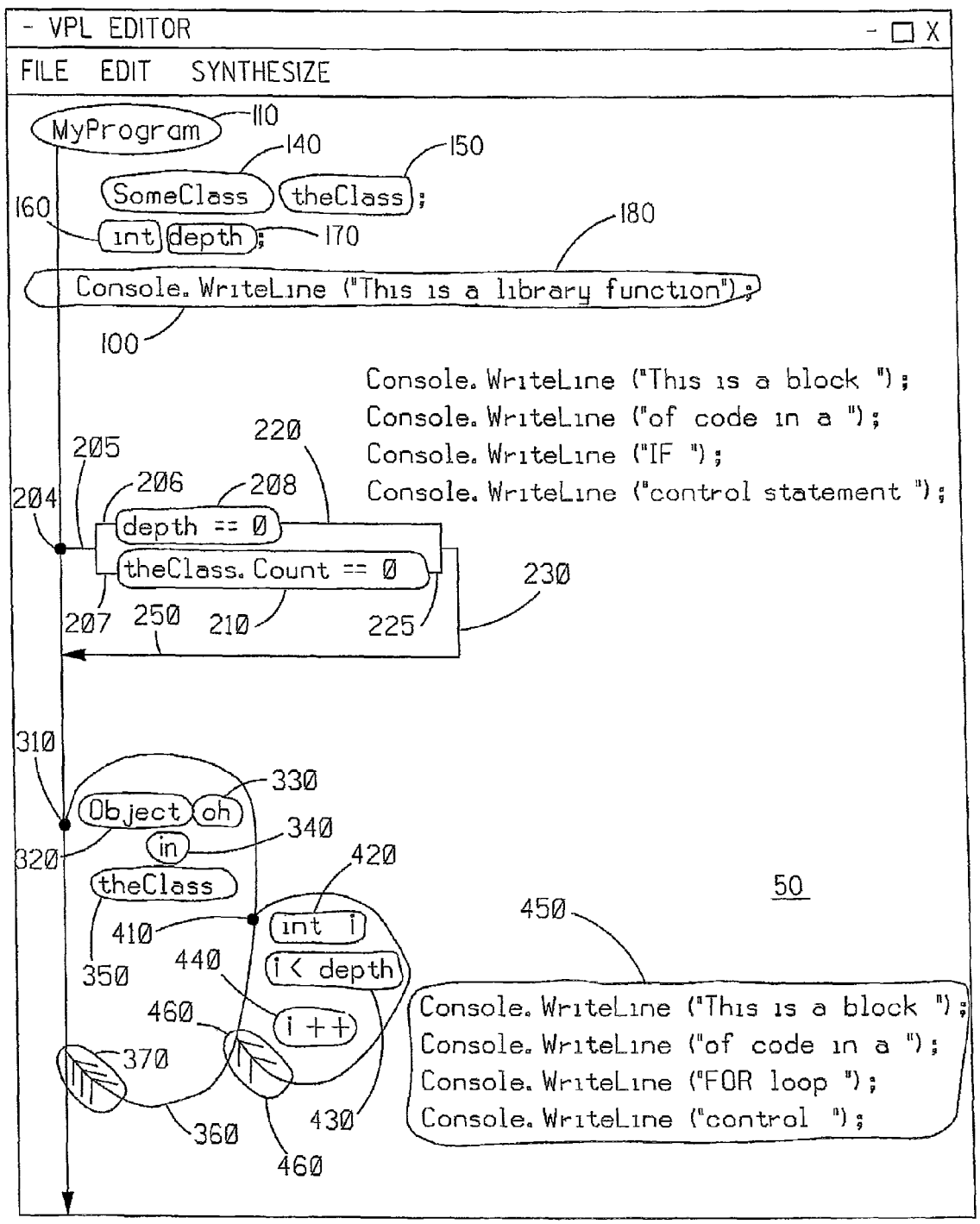

FIG. 10 is an instantiation of a nested looping control construct branching off of the previous looping control flow. This particular looping control construct is analogous to a 'for' loop in C#. Element 410 depicts the entry point of the looping statement branching from the previous control flow. Element 420 depicts a local variable type declaration to the looping body. Element 430 depicts a conditional expression that resolves to true or false and is the terminating condition for the loop. Element 440 is an assignment statement associated with the control condition in element 430. Element 450 depicts the local branch of control flow that is executed while the condition in element 430 resolves to true. Element 450 is also known as the shapes body. Element 460 depicts a double-headed arrow representing the point of return to the calling thread of execution. The shape of element 460 differentiates this loop from other forms of looping control constructs, such as 'foreach' and 'while' loops.

The user constructs the visual shape by drawing a curved arc intersecting the main branch at element 410 and initially extending the curve in the upward direction, then looping the curve downward and then back up to intersect the calling branch again at element 460. The user then draws two arrow heads as depicted in element 460. The computer recognizes this shape as a looping control construct and responds with a prompt for the expression in element 420. The user types the expression. The computer responds by prompting the loop control expression depicted in element 430. The user types the expression. The computer responds by prompting for the assignment expression depicted in element 440. The computer stores the shape representation and it's text in variables adhering to the internal data structures.

Element 450 depicts a block of non-control-construct statements that are created when the user types text without a prompt from the computer. This is analogous to typing into a normal text editor at the current cursor location.

This embodiment would synthesize the corresponding C# code as depicted in the following Listing 5 for the illustration in FIG. 10:

Listing 5

```
namespace MyProgram
{
  class MyProgram
  {
    static void Main( )
    {
      SomeClass theClass;
      int depth;
      Console.WriteLine("This is a library function");
      if(depth == 0 || theClass.Count == 0)
      {
        Console.WriteLine("This is a block ");
        Console.WriteLine("of code in an ");
        Console.WriteLine("IF ");
        Console.WriteLine("control statement");
      }
      foreach(Object oh in theClass)
      {
        for(int i; i < depth; i++)
        {
          Console.WriteLine("This is a block ");
          Console.WriteLine("of code in an ");
          Console.WriteLine("FOR loop ");
          Console.WriteLine("control statement");
        }
      }
    }
  }
}
```

Figure 11A:
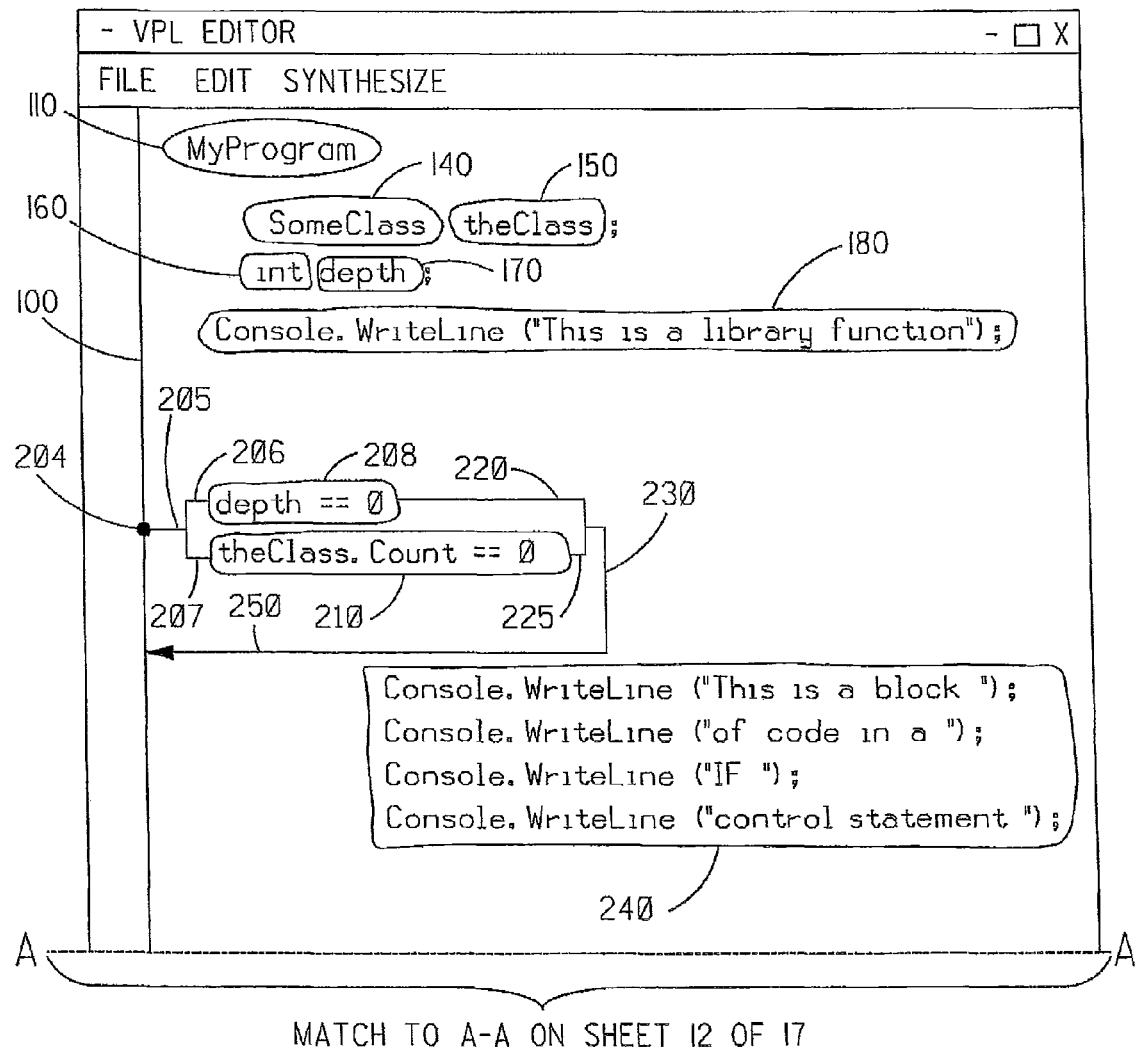
Figure 11B:
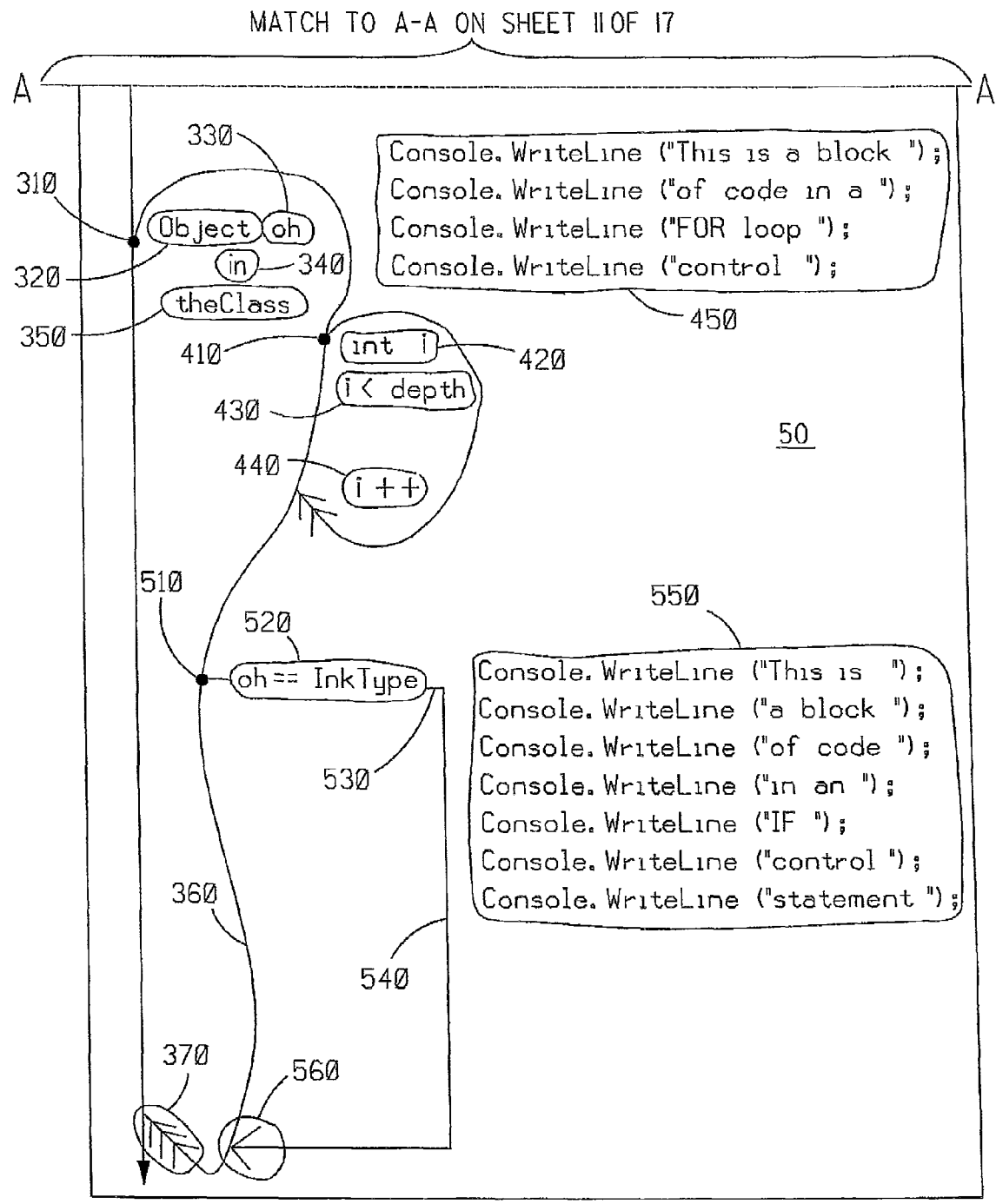

FIGS. 11*a*-11*b* show an instantiation of a nested conditional control-flow statement branching off of the previous thread of execution. Element 510 depicts the entry point of a conditional statement branching from the previous control flow. Element 520 depicts a Boolean control statement that resolves to either true or false. Element 530 depicts the point of control flow that returns program control flow into the shape's body. Element 540 depicts the local branch of control flow, or the shapes body. Element 550 depicts a block of non-control-construct statements that are executed if the condition in element 520 resolves to true. Element 560 is the return path of control-flow to the calling thread of execution.

The user constructs the visual shape by first drawing a line segment from a point intersecting the preceding branch to the left and extending the line segment to the right as depicted in element 510. The computer recognizes the shape as a conditional expression and responds with a prompt for a conditional expression. The user types the conditional expression "oh==InkType". The computer responds by completing the conditional expression shape depicted in elements 530, 540 and 560. This is analogous to completing an electrical circuit. The computer stores the shape representation and it's text in variables adhering to the internal data structures that represent a structured syntax tree conforming to standard compiler theory.

Element 550 depicts a block of non-control-construct statements that are created when the user types text without a prompt from the computer. This is analogous to typing into a normal text editor at the current cursor location.

This embodiment would synthesize the corresponding C# code as depicted in the following Listing 6 for the illustration in FIGS. 11*a*-11*b*:

Listing 6

```
namespace MyProgram
{
  class MyProgram
  {
    static void Main( )
    {
      SomeClass theClass;
      int depth;
      Console.WriteLine("This is a library function");
      if(depth == 0 || theClass.Count == 0)
      {
        Console.WriteLine("This is a block ");
        Console.WriteLine("of code in an ");
        Console.WriteLine("IF ");
        Console.WriteLine("control statement");
      }
      foreach(Object oh in theClass)
      {
        for(int i; i < depth; i++)
        {
          Console.WriteLine("This is a block ");
          Console.WriteLine("of code in an ");
          Console.WriteLine("FOR loop ");
          Console.WriteLine("control statement");
        }
        if(oh == InkType)
        {
          Console.WriteLine("This is ");
          Console.WriteLine("a block ");
          Console.WriteLine("of code ");
          Console.WriteLine("in an ");
          Console.WriteLine("IF ");
          Console.WriteLine("control ");
          Console.WriteLine("statement");
        }
      }
    }
  }
}
```

Editing and moving shapes may be achieved by click-and-drag, and drag-and-drop techniques to change the imperative logic for the order of program execution. For example, moving a visual statement from one level of block hierarchy to another sub-block changes the order of program execution. Entire blocks, and their sub-blocks may be moved and manipulated, or even deleted.

Comparison logic is edited by similar click-and-drag, drag-and-drop techniques. Changing the sequence of expressions into different series or parallel order changes the logic of the comparison conditions. Likewise, applying or removing "not" conditions.

Figure 12A:
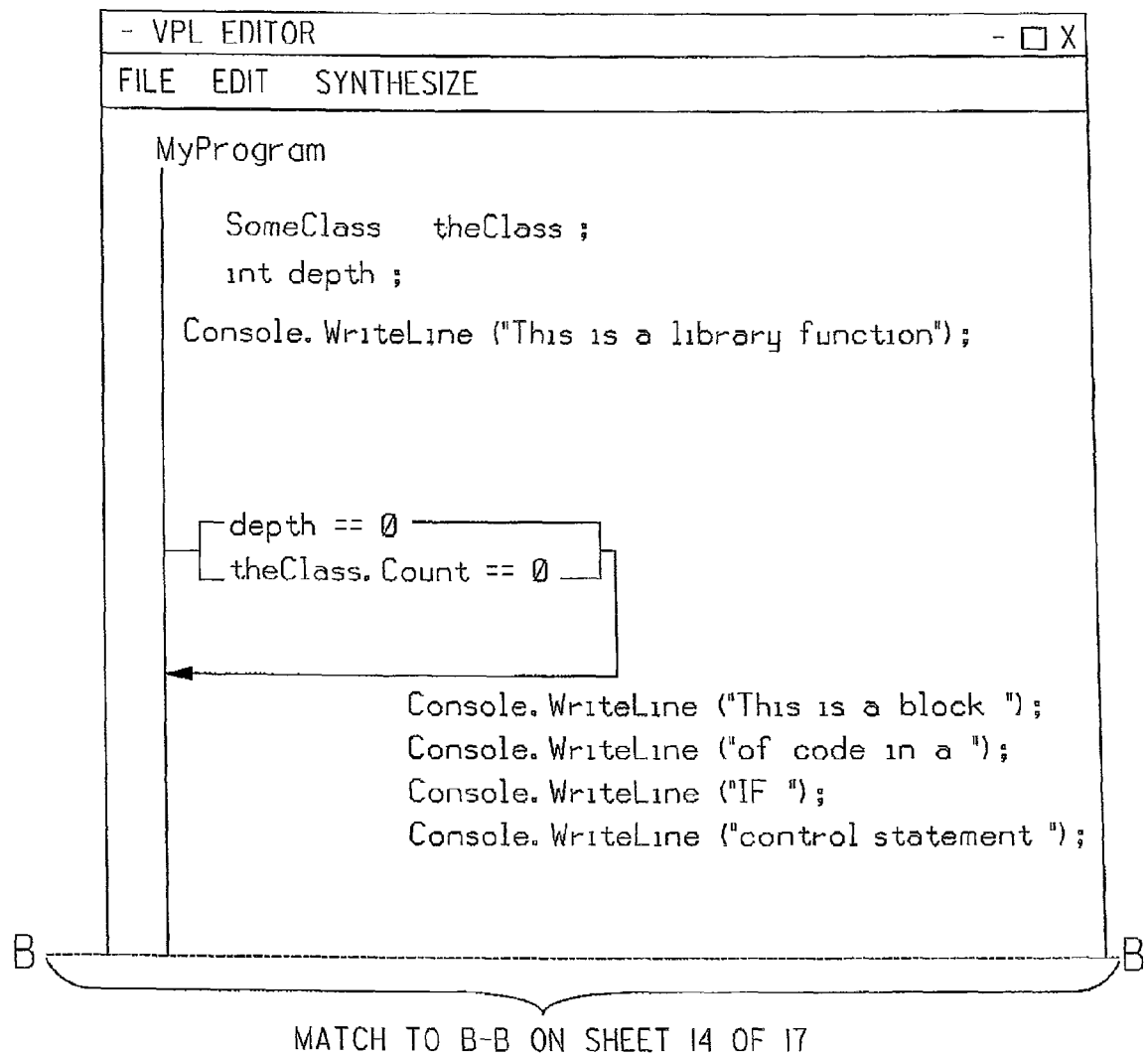
FIGS. 12a-12b show a final diagram made from the drawing symbols and data entries made in FIGS. 6-11b.
Figure 12B:
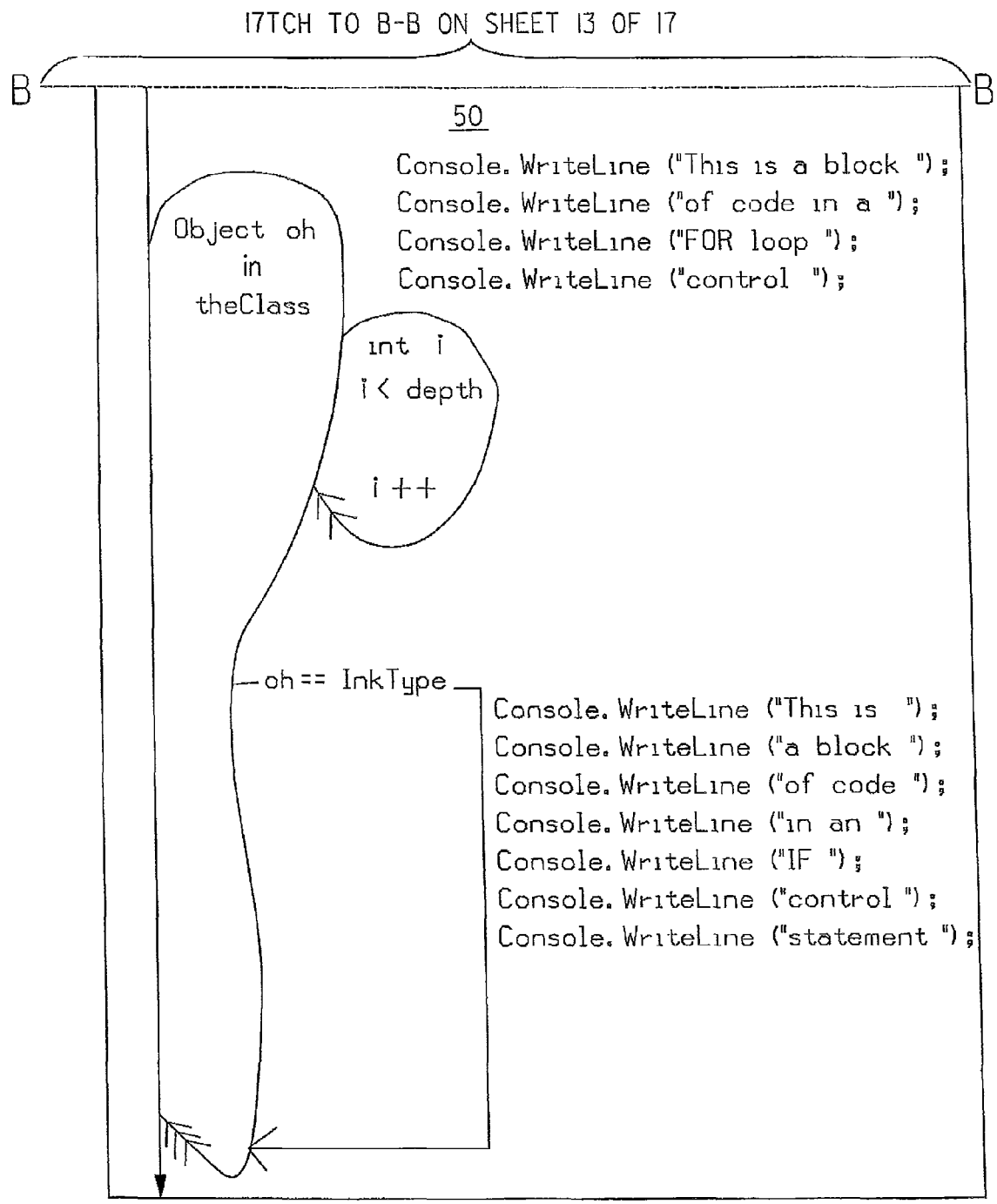
Figures 13A, 13B, 13C:
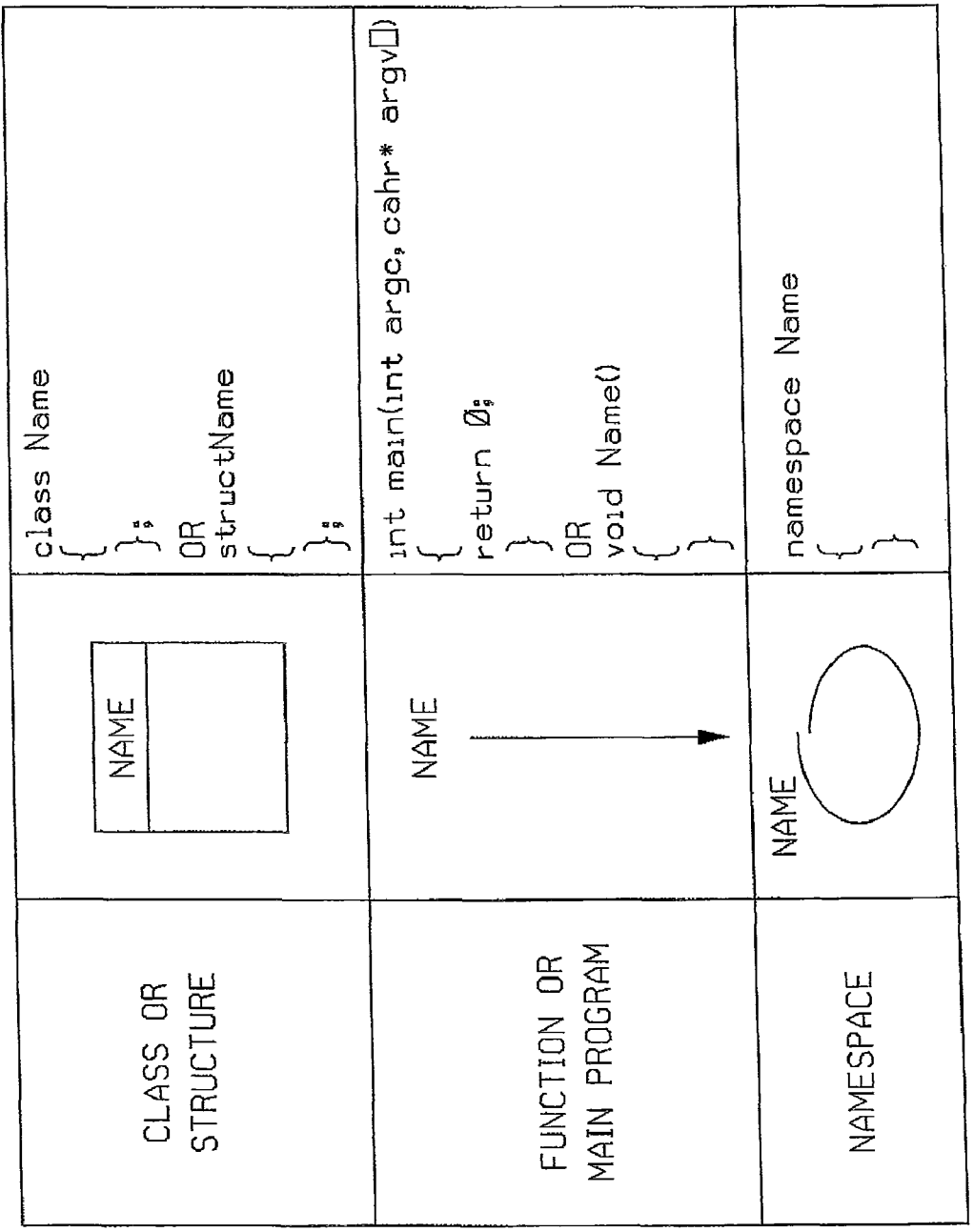
Figure 13D:
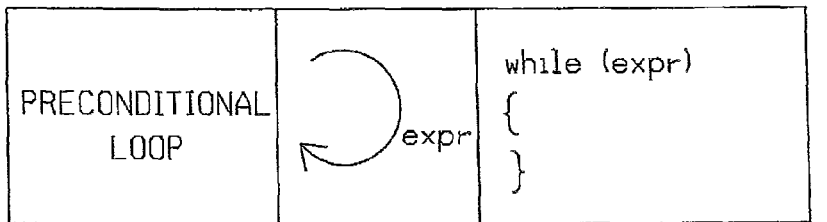
Figure 13E:
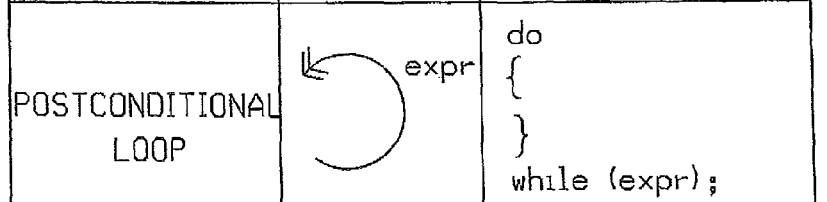
Figure 13F:
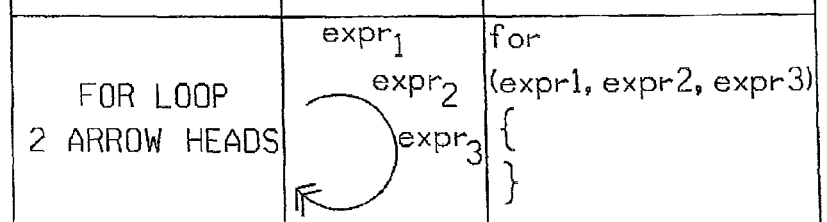
Figure 13G:
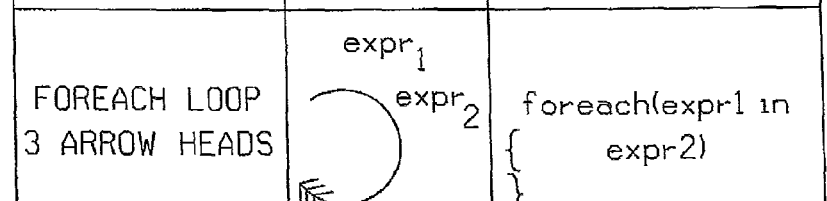
Figure 13H:
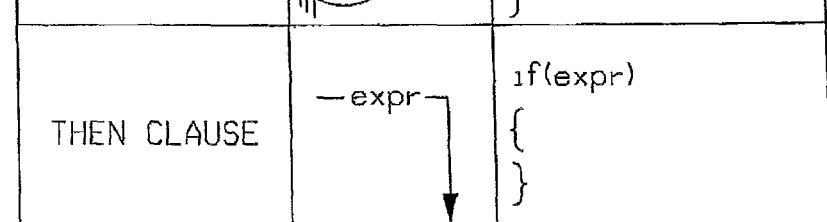
Figure 13I:
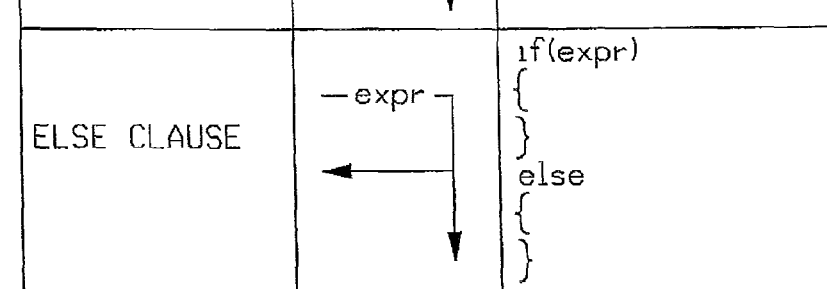

FIGS. 12*a*-12*b* illustrate the completed program without detailed elements whose corresponding code is depicted in Listing 6 above.

FIGS. 13(*a*)-13(*m*) illustrate exemplary, non-limiting visual shape control constructs and their text-based equivalencies in accordance with the present invention that can be implemented.

As can be seen, the present invention enables a user to enter non-character based drawing symbols (drawing figures or drawing strokes) into a computer, which, in response thereto, prompts the user to enter data related to a programming function corresponding to each drawing symbol. In response to the entry of data for each drawing symbol, the computer converts the data into the corresponding correct syntax for the function associated with the drawing symbol. To each drawing symbol, one or more additional drawing symbols can be connected to define one or more functions and the corresponding syntax to be executed. Thus, by simply using drawing symbols and, for each drawing symbol, entering data related to functions corresponding to said symbol, a user can form a computer program or thread of execution that includes correctly syntaxed programming instructions.

The present invention has been described with reference to the preferred embodiment. Obvious modifications and alterations will occur to others upon reading and understanding the preceding detailed description. For example, the present invention was described in connection with the use of a pen for entering drawing symbols on a Tablet PC. However, this is not to be construed as limiting the invention since it is envisioned that other means for entering drawing symbols or figures into a suitably programmed computer can also or alternatively be utilized. For example, instead of utilizing a pen to input drawing symbols into a Tablet PC, a user can also or alternatively use his finger on a touchpad of a computer to enter such drawing symbols. It is intended that the invention be construed as including all such modifications and alterations insofar as they come within the scope of the appended claims or the equivalents thereof.

The invention claimed is:

1. A method of computer programming comprising:
   (a) receiving a drawing shape or drawing figure input into a computer via a user interface of said computer without preselection of said drawing shape or drawing figure;
   (b) receiving data input into said computer via the user interface in response to a prompt that is generated related to the drawing shape or drawing figure received in step (a); and
   (c) synthesizing computer programming code related to the drawing shape or drawing figure received in step (a) and the data received in step (b).

2. The method of claim 1, further including repeating steps (a)-(c) for at least one other drawing shape or drawing figure that has an entry point connected to a previously entered drawing shape or drawing figure.

3. A computer comprising a processor, computer storage and a user interface operatively coupled together, the computer storage having stored thereon instructions which, when executed by the processor, cause the processor to:
   (a) receive a drawing shape or drawing figure input into the user interface without preselection of said drawing shape or drawing figure;
   (b) receive data input into the user interface in response to a prompt that is generated related to the drawing shape or drawing figure received in step (a); and
   (c) synthesize computer programming code related to the drawing shape or drawing figure received in step (a) and the data received in step (b).

4. The computer of claim 3, wherein the instructions further cause the processor to repeat steps (a)-(c) for at least one other drawing shape or drawing figure that has an entry point connected to a previously entered drawing shape or drawing figure.

* * * * *